S. T. OWENS.
Regenerator for Reverberatory Furnaces.
No. 214,183. Patented April 8, 1879.

S. T. OWENS.
Regenerator for Reverberatory Furnaces.
No. 214,183. Patented April 8, 1879.

UNITED STATES PATENT OFFICE.

SAMUEL T. OWENS, OF ALLEGHENY, PENNSYLVANIA.

IMPROVEMENT IN REGENERATORS FOR REVERBERATORY FURNACES.

Specification forming part of Letters Patent No. 214,183, dated April 8, 1879; application filed December 21, 1878.

*To all whom it may concern:*

Be it known that I, SAMUEL T. OWENS, of Allegheny, in the county of Allegheny and State of Pennsylvania, have invented certain new and useful Improvements in Regenerators for Reverberatory Furnaces; and I do hereby declare the following to be a full, clear, and exact description of the invention, such as will enable others skilled in the art to which it pertains to make and use it, reference being had to the accompanying drawings, which form part of this specification.

My invention relates to an improvement in regenerators for reverberatory furnaces; and it consists in placing the bricks which are to store up the heat, and through which passes the incoming gases or air, in chambers which are heated from above and below, or from both sides, by the waste products of combustion, whereby the bricks are heated only by radiation instead of by the direct action of the flame and gases, as will be more fully described hereinafter.

Figure 1:
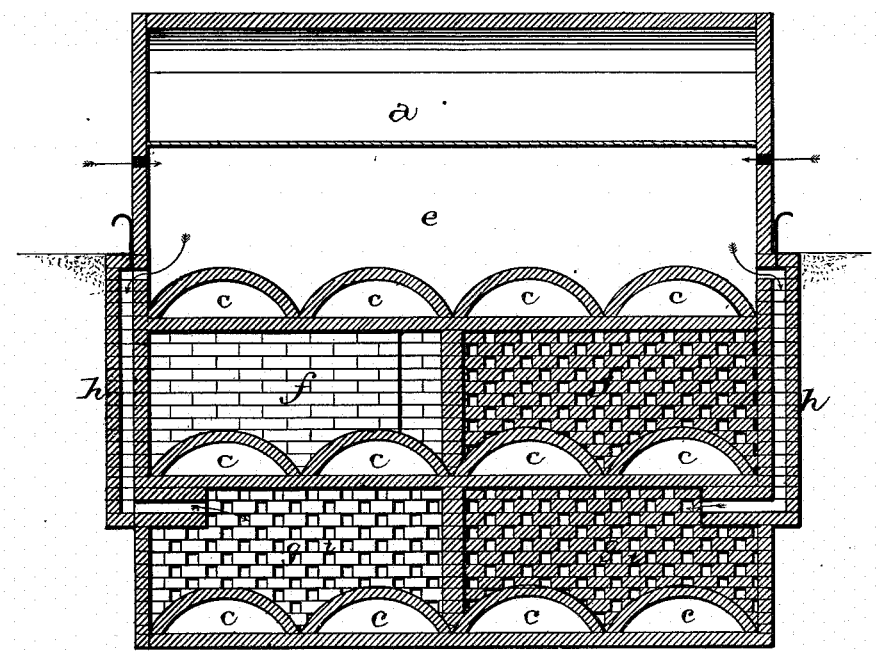
Figure 2:
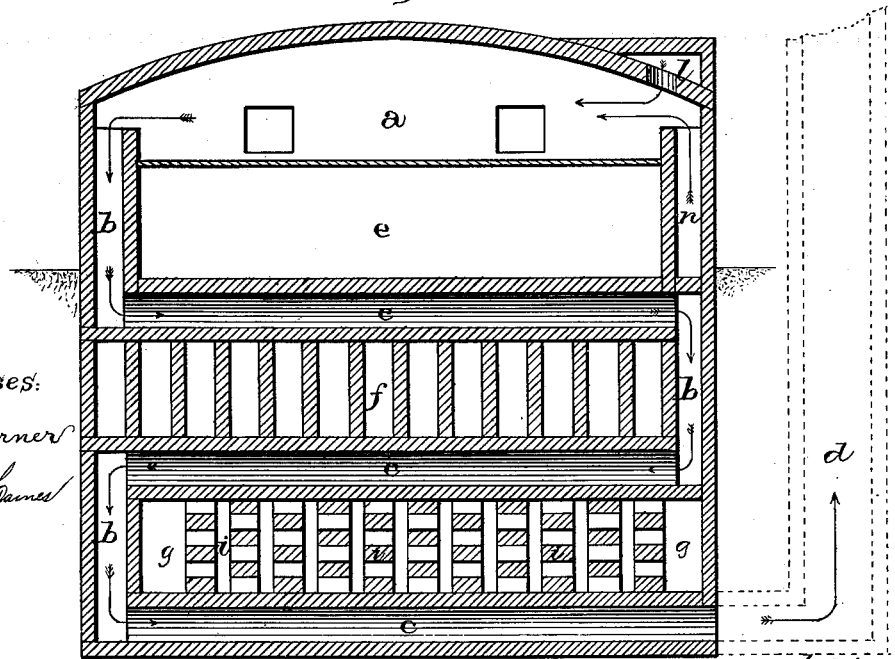
Figure 3:
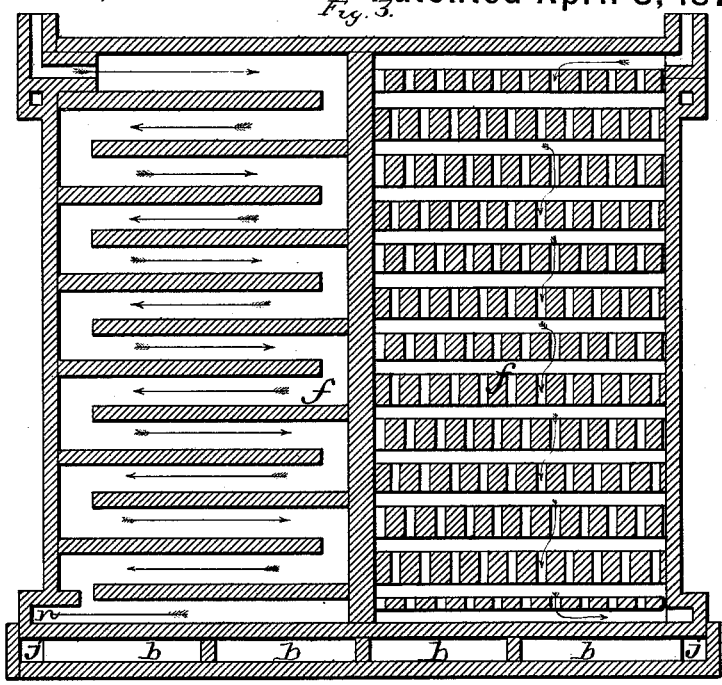
Figure 4:
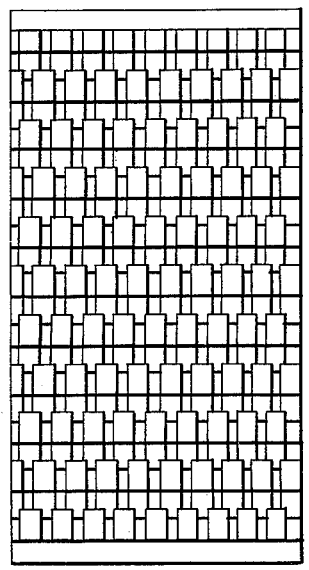

Figures 1 and 2 are vertical sections of my invention, taken at right angles to each other. Fig. 3 is a horizontal section of the same. Fig. 4 is a detail view, showing one of the methods of arranging the bricks.

$a$ represents the reduction-chamber, from which the waste products of combustion pass down through the vertical flues $b$ and the horizontal ones $c$ to the stack $d$. Of these flues $b$ $c$ there will be a sufficient number to absorb nearly all of the waste heat before it can escape up the stack, and thus utilize it in heating the incoming air and gases, so as to prepare them for combustion without taking any heat that would otherwise be used in the reduction of the ore for this purpose. Above and below these horizontal flues are placed the chambers $e, f,$ and $g$, which are heated by the waste products of combustion as they pass through the flues, and through which chambers the incoming air and gas pass on their way to the reduction-chamber $a$.

Just under the chamber $a$ is the chamber $e$, into which the cold air enters, is heated by passing over the tops of the flues $c$, passes down through the air-flues $h$ into the air-chamber $g$, where it is heated by being passed through the piles of heated brick, $i$, contained therein, and then passes up through the flue $j$ to the chamber $l$ at one side of the chamber $a$, into which it escapes, as shown in Fig. 2.

The gas may be generated in an apparatus for that purpose, taken directly from a gas-well or any other suitable source, and is passed into the chamber $f$, where it passes back and forth through piles of highly-heated brick, and then passes up through the flue $n$ into the reducing-chamber $a$, just under where the air is discharged. The gas, being lighter than the air, rises up and mingles with it as the air descends, and thus causes a more perfect combustion.

It will be seen that the bricks in the chambers $f$ $g$ are so inclosed as to be entirely protected from the direct action of the products of combustion, and are only heated by radiation instead of actual contact. Where the products of combustion pass through the bricks and in actual contact therewith, the great heat and the cutting action of the flame soon melt the brick, and run them together so as to close up the passages-through them.

When subjected to actual contact with the products of combustion the bricks seldom last more than a few months; and as they run together in melting, they can only be removed from the furnace by quarrying them out, which is a slow and expensive operation, to say nothing of the loss of the use of the furnace during that time. By heating the bricks by radiation only, not only can a commoner and cheaper brick be used, but they will last for years.

The method of piling the bricks in the chambers may be varied according to taste. In some instances they will be piled so as to form one long continuous flue, which doubles back and forth upon itself the whole length of the chamber; and in other cases the brick will be piled so that their ends will overlap each other, and only leave small passages between them; and in still other cases the brick will be piled in separate and distinct rows, as seen in the lower part of Fig. 2, with small openings through each pile. I do not limit myself to any one method of piling them, however, as this is a matter of choice.

In small furnaces but a single set of heating-chambers and flues are necessary; but in larger furnaces two sets of chambers and flues are used, in order to obtain an increase of heat.

Where two sets of chambers and flues are used, the products of combustion pass continuously through both sets of flues; but the air and gas are passed only through one set of chambers. When the bricks in that set become somewhat cooled off, the valves are closed so as to shut off the air and gas from them, and they are then turned through the second set of chambers, while the bricks in the first set are being reheated.

I am aware that it is common to heat the incoming air and gas by the outgoing products of combustion, which pass over and around the chambers or tubes containing the air and gas, and this I disclaim.

Having thus described my invention, I claim—

A regenerator for furnaces, consisting of one or more chambers, $f\ g$, placed between the flues $c$, and filled or partially filled with brick, which brick are heated by radiation from the flues $c$, and serve to heat the incoming air and gas, substantially as set forth.

In testimony that I claim the foregoing I have hereunto set my hand this 21st day of December, 1878.

SAMUEL T. OWENS.

Witnesses:
 W. S. D. HAINES,
 WILLIAM FITCH.